United States Patent
Yokota

(10) Patent No.: US 10,645,571 B2
(45) Date of Patent: May 5, 2020

(54) INFORMATION DELIVERY SYSTEM, INFORMATION DELIVERY METHOD, AND SERVER APPARATUS

(71) Applicant: FUJITSU LIMITED, Kawasaki-shi, Kanagawa (JP)

(72) Inventor: Koichi Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/199,426

(22) Filed: Nov. 26, 2018

(65) Prior Publication Data
US 2019/0182661 A1 Jun. 13, 2019

(30) Foreign Application Priority Data
Dec. 7, 2017 (JP) ................................. 2017-235144

(51) Int. Cl.
| | |
|---|---|
| *H04W 4/02* | (2018.01) |
| *H04W 8/24* | (2009.01) |
| *G06F 8/61* | (2018.01) |
| *H04L 29/08* | (2006.01) |
| *H04W 88/02* | (2009.01) |
| *H04W 84/12* | (2009.01) |

(52) U.S. Cl.
CPC .............. *H04W 8/245* (2013.01); *G06F 8/61* (2013.01); *H04L 67/1021* (2013.01); *H04L 67/34* (2013.01); *H04W 4/02* (2013.01); *H04W 84/12* (2013.01); *H04W 88/02* (2013.01)

(58) Field of Classification Search
CPC ............................ H04L 67/34; H04L 67/1021
See application file for complete search history.

(56) References Cited

U.S. PATENT DOCUMENTS

| | | | | |
|---|---|---|---|---|
| 8,595,186 B1* | 11/2013 | Mandyam | ................. | G06F 8/38 |
| | | | | 707/632 |
| 9,654,415 B2* | 5/2017 | Kato | ....................... | H04L 47/76 |
| 2004/0137917 A1* | 7/2004 | Ohto | ...................... | H04W 40/20 |
| | | | | 455/456.1 |

(Continued)

FOREIGN PATENT DOCUMENTS

| | | |
|---|---|---|
| JP | 2005-115717 | 4/2005 |
| JP | 2006-65516 | 3/2006 |
| WO | 2016/132454 | 8/2016 |

*Primary Examiner* — Jean A Gelin
(74) *Attorney, Agent, or Firm* — Fujitsu Patent Center

(57) ABSTRACT

An information delivery system includes a server apparatus and a plurality of information processing apparatuses that deliver an application to a terminal device, wherein the server apparatus specifies the terminal device to which the application is delivered in accordance with a positional relationship between a first information processing apparatus of the plurality of information processing apparatuses and the terminal device, and makes a delivery request of the application that is to be delivered to the specified terminal device to another information processing apparatus that differs from the first information processing apparatus of the plurality of information processing apparatuses based on a load of delivery of the application of the plurality of information processing apparatuses, and wherein the plurality of information processing apparatuses deliver the application to the terminal device in accordance with the delivery request when receiving the delivery request from the server apparatus.

6 Claims, 13 Drawing Sheets

(56) References Cited

U.S. PATENT DOCUMENTS

| | | | |
|---|---|---|---|
| 2005/0203673 A1* | 9/2005 | El-Hajj | G06Q 10/08 701/1 |
| 2007/0064266 A1* | 3/2007 | Yamauchi | G06F 3/1222 358/1.15 |
| 2008/0167048 A1* | 7/2008 | Liu | H04W 36/22 455/445 |
| 2008/0320495 A1* | 12/2008 | Akiyama | G06F 9/542 719/318 |
| 2011/0131654 A1* | 6/2011 | Taneja | H04L 63/1416 726/23 |
| 2012/0096455 A1* | 4/2012 | Katsumata | G06F 8/61 717/177 |
| 2013/0247117 A1* | 9/2013 | Yamada | G08C 17/02 725/93 |
| 2014/0029423 A1* | 1/2014 | Badhani | H04L 47/125 370/235 |
| 2017/0230526 A1* | 8/2017 | Hayashi | H04N 1/00949 |
| 2017/0244637 A1* | 8/2017 | Singhal | H04L 45/7453 |
| 2017/0366534 A1* | 12/2017 | Tsunoda | G06F 13/00 |
| 2018/0069662 A1* | 3/2018 | Sugaya | H04W 4/06 |
| 2018/0077231 A1* | 3/2018 | Machida | H04L 67/1097 |
| 2018/0139582 A1* | 5/2018 | Itasaki | H04W 4/027 |
| 2018/0184357 A1* | 6/2018 | Yamasaki | H04M 11/08 |
| 2019/0007237 A1* | 1/2019 | Paramasivam | H04L 49/9005 |
| 2019/0259066 A1* | 8/2019 | Asukai | G06Q 30/0255 |

\* cited by examiner

FIG. 7

| TERMINAL ID | RESOURCE INFORMATION | | | APPLICATION MANAGEMENT INFORMATION 410 | |
|---|---|---|---|---|---|
| | COMMUNICATION METHOD | POSITION INFORMATION | BATTERY LEVEL | USABLE APPLICATION | APPLICATION USE HISTORY |
| 101 | WiFi (REGISTERED TRADEMARK) | X,Y | 50% | APPLICATION A | APPLICATIONS A AND B |

TIME OF COLLECTION 11/25/2017 10:00

| SERVER ID | DELIVERY APPLICATION | NUMBER OF CONNECTIONS | ALLOWED DELIVERY TIME | DELIVERY-SCHEDULED TERMINAL ID | DELIVERY RECORD | DELIVERY TIME |
|---|---|---|---|---|---|---|
| 1 | APPLICATION A | 2 | — | 101 | YET DONE | — |
|   |   |   |   | 102 | DONE | 10 SECONDS |
| 2 | APPLICATION B | 2 | — | 101 | YET DONE | — |
|   |   |   |   | 103 | YET DONE | — |

211

212

TIME OF COLLECTION 11/25/2017 10:00

| TERMINAL ID | RESOURCE INFORMATION | | | | APPLICATION MANAGEMENT INFORMATION | |
|---|---|---|---|---|---|---|
|   | COMMUNICATION METHOD | POSITION INFORMATION | BATTERY LEVEL | | USABLE APPLICATION | APPLICATION USE HISTORY |
| 101 | WiFi | — | 50% | | APPLICATION B | APPLICATIONS A AND B |
| 102 | WiFi | — | 10% | | APPLICATION B | APPLICATION B |

INFORMATION DELIVERY SYSTEM, INFORMATION DELIVERY METHOD, AND SERVER APPARATUS

CROSS-REFERENCE TO RELATED APPLICATION

This application is based upon and claims the benefit of priority of the prior Japanese Patent Application No. 2017-235144, filed on Dec. 7, 2017, the entire contents of which are incorporated herein by reference.

FIELD

The embodiments discussed herein are related to an information delivery system, an information delivery method, and a server apparatus.

BACKGROUND

A known application delivery system delivers an application to a terminal in a service coverage area in which a server provides service. A known technique of this system is that when the load of application delivery is concentrated on a specific server, a delivery request of an application that is to be delivered from the specific server is made to another server so that the load is inhibited from concentrating. Examples of the related art are disclosed in International Publication Pamphlet No. WO 2016/132454, Japanese Laid-open Patent Publication No. 2006-65516, and Japanese Laid-open Patent Publication No. 2005-115717.

SUMMARY

According to an aspect of the embodiments, An information delivery system includes a server apparatus and a plurality of information processing apparatuses that deliver an application to a terminal device, wherein the server apparatus specifies the terminal device to which the application is delivered in accordance with a positional relationship between a first information processing apparatus of the plurality of information processing apparatuses and the terminal device, and makes a delivery request of the application that is to be delivered to the specified terminal device to another information processing apparatus that differs from the first information processing apparatus of the plurality of information processing apparatuses based on a load of delivery of the application of the plurality of information processing apparatuses, and wherein the plurality of information processing apparatuses deliver the application to the terminal device in accordance with the delivery request when receiving the delivery request from the server apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a terminal information database according to the first embodiment;

FIG. 8 illustrates an example of a system information database according to the first embodiment;

DESCRIPTION OF EMBODIMENTS

Movement of a terminal device in the service coverage area is not taken into consideration for the above technique. Accordingly, the existing application delivery system makes a delivery request of an application that is to be delivered by a server to another server even for a terminal device that moves toward the outside of the service coverage area of the server.

Consequently, there is a possibility that the existing application delivery system makes the delivery request to the other server for the terminal device to which the application may not be delivered.

It is an object according to an aspect to inhibit an unnecessary delivery request of an application from being made.

First Embodiment

Figure 1:
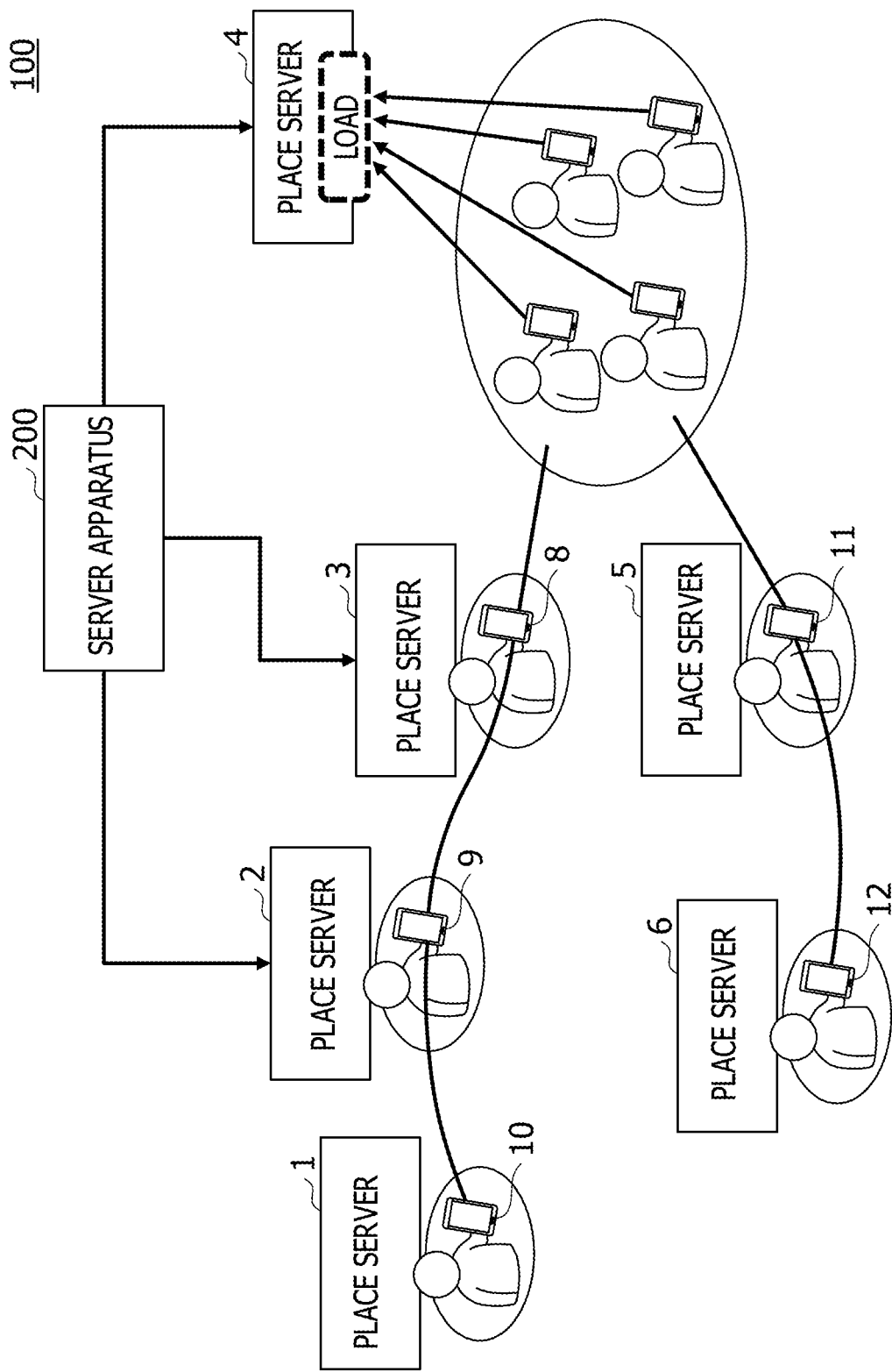
FIG. 1 schematically illustrates an information delivery system according to a first embodiment.

A first embodiment will now be described with reference to the drawings. FIG. 1 schematically illustrates an information delivery system according to the first embodiment.

In the information delivery system according to the present embodiment illustrated in FIG. 1, place servers 1 to 6 deliver applications that are provided by the place servers to terminal devices when the terminal devices in the service coverage area of the place servers get access thereto.

A server apparatus 200 manages, for example, the place servers 1 to 6, the load of each of the place servers, and application delivery of the place servers.

In an example in FIG. 1, there are a large number of the terminal devices in the service coverage area of the place server 4, and the load of application delivery of the place server 4 is equal to or more than a predetermined degree.

In this case, the server apparatus 200 detects that the load of the place server 4 is equal to or more than the predetermined degree, and requests another place server to deliver the application that is to be delivered by the place server 4.

At this time, the server apparatus 200 finds the place server to which the terminal device that is nearest to the place server 4 among the terminal devices that move toward the service coverage area of the place server 4 is connected, and requests the place server to deliver a part of the application that is to be delivered by the place server 4.

In the example in FIG. 1, terminal devices 8 to 10 move toward the service coverage area of the place server 4. Accordingly, it is assumed that the terminal devices 8 to 10 are highly likely to use the application that is to be delivered by the place server 4.

In the example in FIG. 1, terminal devices 11 and 12 move away from the service coverage area of the place server 4. Accordingly, it is assumed that the terminal devices 11 and 12 are less likely to use the application that is to be delivered by the place server 4.

In view of this, according to the present embodiment, the server apparatus 200 requests the place server 3 that is connected to the terminal device 8 to deliver the part of the application to the terminal device 8 that is nearest to the place server 4 among the terminal devices 8 to 10 that approach the service coverage area of the place server 4. At this time, the place server 4 delivers the part of the application that is to be delivered by the place server 4 to the place server 3.

At this time, regarding the terminal devices 11 and 12 that move away from the place server 4, the server apparatus 200 may not make the delivery request of the application to the place servers 5 and 6 to which the terminal devices 11 and 12 are connected.

For example, the server apparatus 200 of an information delivery system 100 according to the present embodiment controls the delivery request of the application of the place server the load of which is equal to or more than the predetermined degree in accordance with the load of application delivery of place servers 300 and the positional relationship between the place servers 300 and terminal devices 400.

According to the present embodiment, unnecessary delivery requests of the application to the place servers 5 and 6 may be thus inhibited from being made. According to the present embodiment, the terminal devices 8 to 10 that move toward the service coverage area of the place server 4 promptly download the application that is provided by the place server 4.

According to the present embodiment, the delivery request of the application may be made to the place server 2 in the case where the load of the place server 4 is still equal to or more than the predetermined degree after the server apparatus 200 makes the delivery request of the part of the application of the place server 4 to the place server 3.

In this case, for example, the server apparatus 200 may cause the place server 3 to deliver about 90% of the application that is to be delivered from the place server 4 to the terminal device 8 that is nearest to the service coverage area of the place server 4. The server apparatus 200 may cause the place server 2 that is farther than the place server 3 from the service coverage area of the place server 4 to deliver about 70% of the application.

In this way, the percentage of the application that is delivered in advance to the terminal device that is nearer to the service coverage area of the place server 4 is increased. This enables the delivery of the application to be promptly completed when the terminal device enters the service coverage area of the place server 4.

Figure 2:
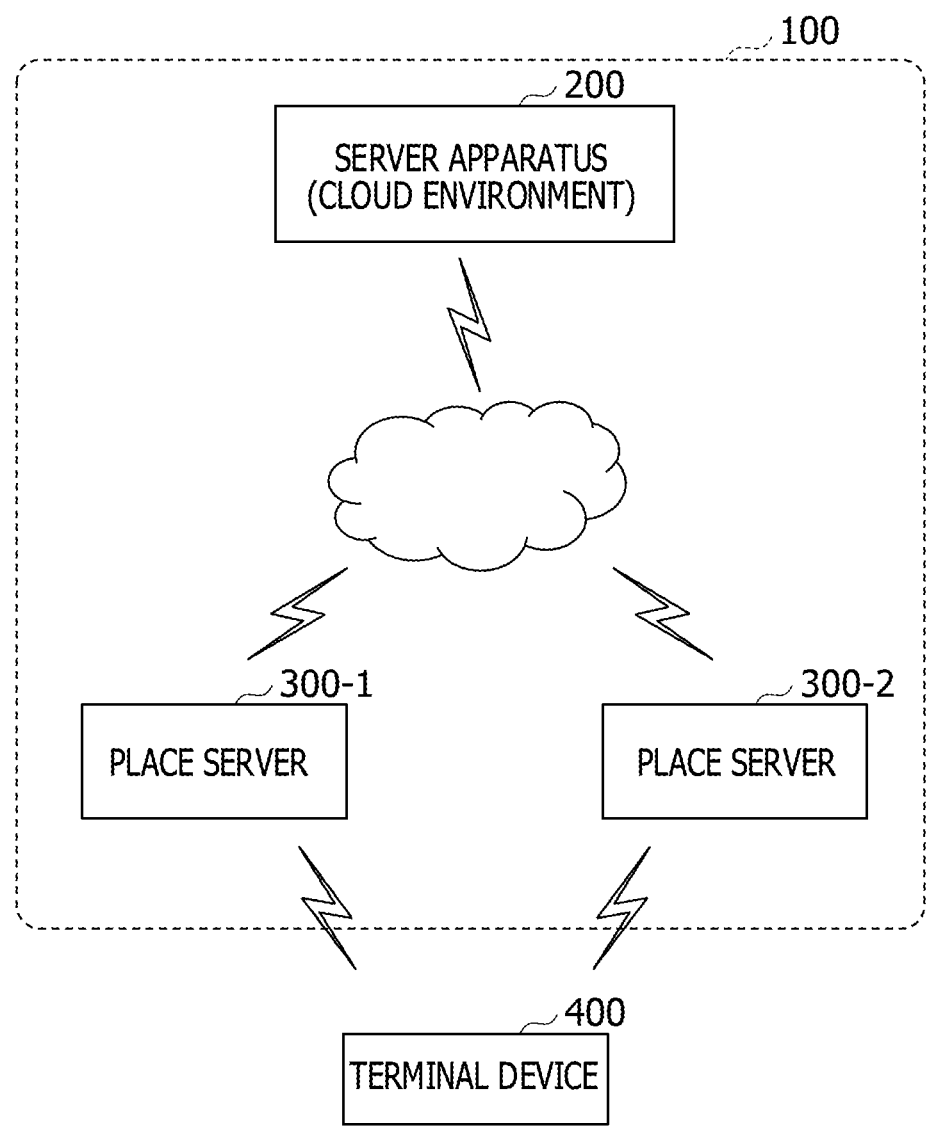
FIG. 2 illustrates an example of the system configuration of the information delivery system according to the first embodiment.

The system configuration of the information delivery system 100 according to the present embodiment will now be described. FIG. 2 illustrates an example of the system configuration of the information delivery system according to the first embodiment.

The information delivery system 100 according to the present embodiment includes the server apparatus 200 and place servers 300-1 and 300-2. In the information delivery system 100, the server apparatus 200 and the place servers 300-1 and 300-2 are connected to each other, for example, with a network interposed there between.

In an example in FIG. 2, the place servers that are included in the information delivery system 100 are the two place servers 300-1 and 300-2. However, the number of the place servers may be determined without limitation. In the following description, the place servers 300-1 and 300-2 are referred to as the place servers 300 when the place servers 300-1 and 300-2 are not distinguished.

An example of the server apparatus 200 according to the present embodiment may be a server apparatus that is disposed in a cloud environment.

When the terminal devices 400 move to the inside of the service coverage area of one of the place servers 300 and get access to the place server 300, the place server 300 according to the present embodiment delivers an application for performing the service that is provided by the place server 300 to the terminal devices 400.

Each place server 300 according to the present embodiment sends information about the terminal devices 400 to which the place server 300 is to deliver the application and information including the number of the terminal devices 400 that are connected to the place server 300 to the server apparatus 200.

Each terminal device 400 sends position information about the position of the terminal device 400, information about the resources of the terminal device 400, and another information to the server apparatus 200.

The server apparatus 200 collects information from the place servers 300 and the terminal devices 400 and specifies the place server 300 the load of which is equal to or more than the predetermined degree based on the collected information. When the place server 300 the load of which is equal to or more than the predetermined degree is specified, the server apparatus 200 requests another place server 300 to deliver the application that is to be delivered by the specified place server 300.

The hardware configurations of the server apparatus 200 and the place servers 300 according to the present embodiment will now be described.

Figure 3:
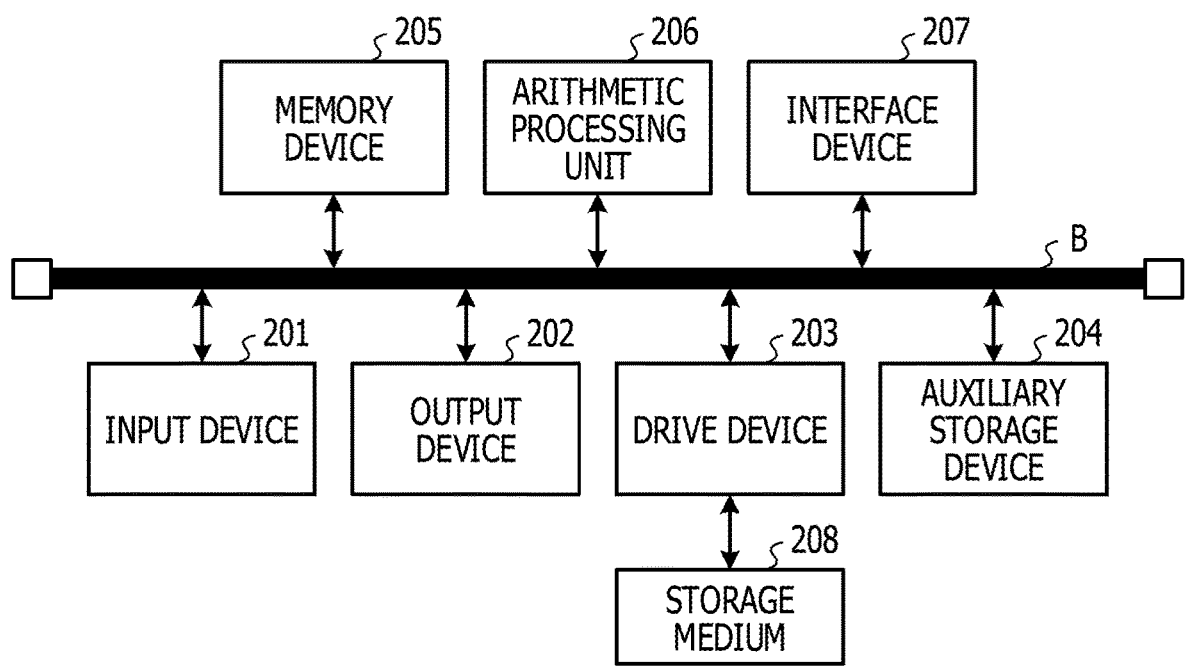
FIG. 3 illustrates an example of the hardware configuration of a server apparatus according to the first embodiment.

FIG. 3 illustrates an example of the hardware configuration of the server apparatus according to the first embodiment.

The server apparatus 200 according to the present embodiment is an information processing apparatus that includes an input device 201, an output device 202, a drive device 203, an auxiliary storage device 204, a memory device 205, an arithmetic processing unit 206, and an interface device 207 that are connected to each other with a bus B.

The input device 201 is a device that inputs a variety of information, and examples thereof include a keyboard and a pointing device. The output device 202 outputs a variety of information, and examples thereof include a display. The interface device 207 includes, for example, a LAN card and is used for connection to a network.

A delivery request program described later is at least one program of various programs that control the server apparatus 200. The delivery request program is provided, for example, by delivery of a storage medium 208 or by being downloaded from the network. The storage medium 208 that stores the delivery request program may be selected from various types of storage media, examples of which include storage media that optically, electrically, or magnetically store information such as a CD-ROM, a flexible disk, and a magneto-optical disk, and semiconductor memories that electrically store information such as a ROM and a flash memory.

The delivery request program is installed in the auxiliary storage device 204 from the storage medium 208 via the drive device 203 when the storage medium 208 that stores the delivery request program is set in the drive device 203. The delivery request program that is downloaded from the network is installed in the auxiliary storage device 204 via the interface device 207.

The auxiliary storage device 204 stores the delivery request program that is installed and stores, for example, files and data that are used for, for example, a system information database described later. The memory device 205 reads and loads the delivery request program from the auxiliary storage device 204 when the server apparatus 200 starts up. The arithmetic processing unit 206 performs various processes described later in accordance with the delivery request program that is loaded on the memory device 205.

Figure 4:
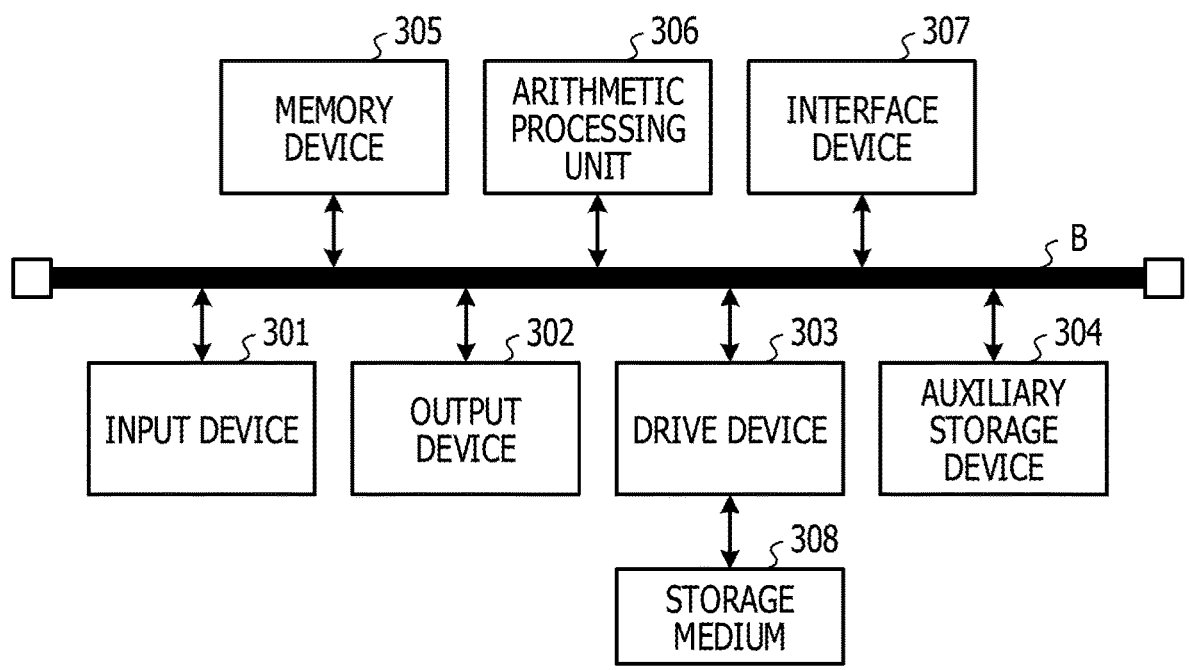
FIG. 4 illustrates the hardware configuration of each of place servers according to the first embodiment.

FIG. 4 illustrates the hardware configuration of each of the place servers according to the first embodiment.

Each place server 300 according to the present embodiment is an information processing apparatus that includes an input device 301, an output device 302, a drive device 303, an auxiliary storage device 304, a memory device 305, an arithmetic processing unit 306, and an interface device 307 that are connected to each other with a bus B.

The input device 301 is a device that inputs a variety of information, and examples thereof include a keyboard and a pointing device. The output device 302 outputs a variety of information, and examples thereof include a display. The interface device 307 includes, for example, a LAN card and is used for connection to the network.

A place information collection program and an application delivery program described later are at least programs of various programs that control each place server 300. The place information collection program and the application delivery program are provided, for example, by delivery of a storage medium 308 or by being downloaded from the network. The storage medium 308 that stores the place information collection program and the application delivery program may be selected from various types of storage media, examples of which include storage media that optically, electrically, or magnetically store information such as a CD-ROM, a flexible disk, and a magneto-optical disk, and semiconductor memories that electrically store information such as a ROM and a flash memory.

The place information collection program and the application delivery program are installed in the auxiliary storage device 304 from the storage medium 308 via the drive device 303 when the storage medium 308 is set in the drive device 303. The place information collection program and the application delivery program that are downloaded from the network are installed in the auxiliary storage device 304 via the interface device 307.

The auxiliary storage device 304 stores the place information collection program and the application delivery program that are installed and stores, for example, files and data that are used for, for example, a place information database described later. The memory device 305 reads and loads the place information collection program and the application delivery program from the auxiliary storage device 304 when the corresponding place server 300 starts up. The arithmetic processing unit 306 performs various processes described later in accordance with the place information collection program and the application delivery program that are loaded on the memory device 305.

Figure 5:
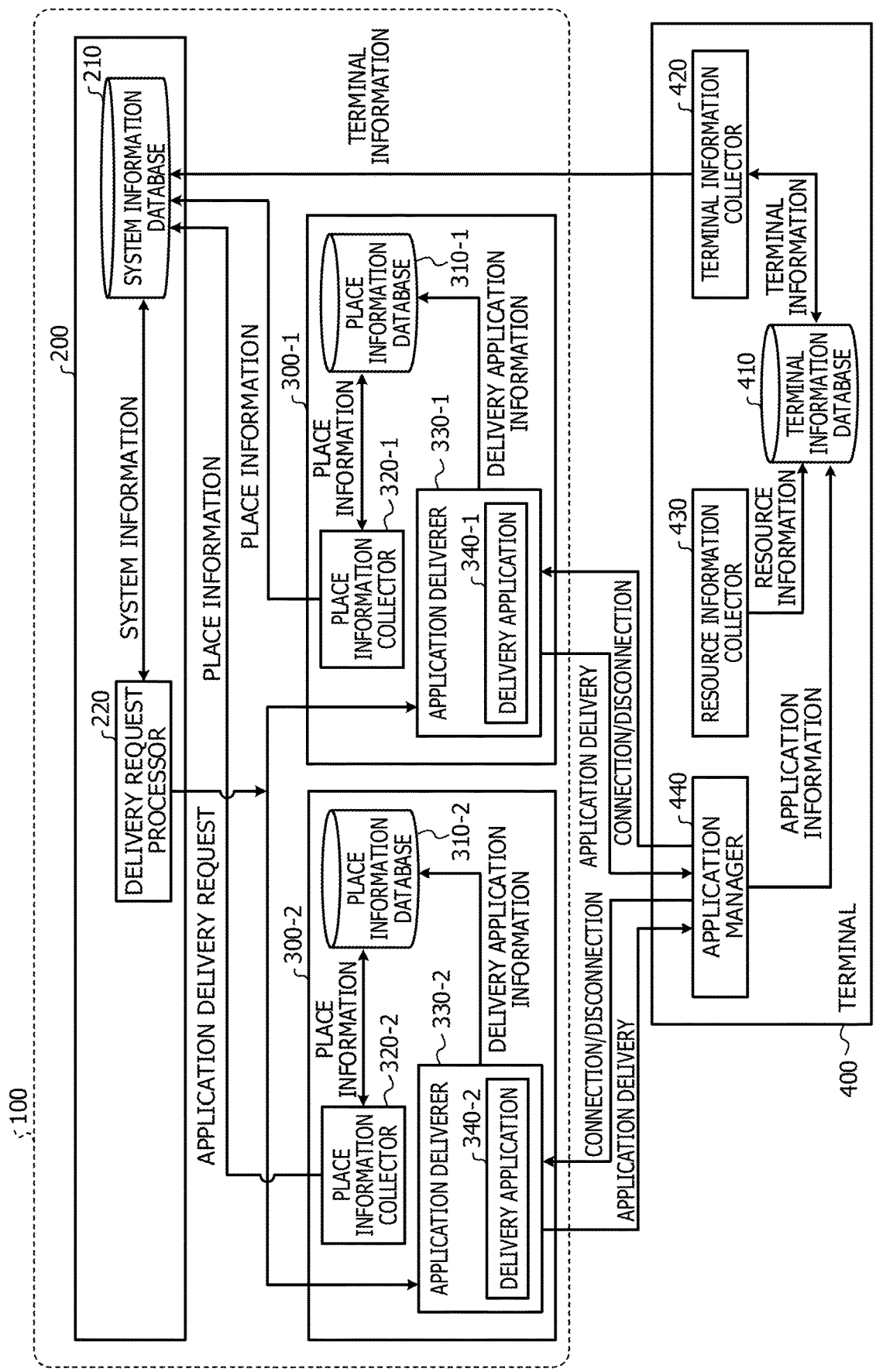
FIG. 5 illustrates the functions of apparatuses that are included in the information delivery system according to the first embodiment.

The functions of apparatuses that are included in the information delivery system 100 according to the present embodiment will now be described with reference to FIG. 5. FIG. 5 illustrates the functions of the apparatuses that are included in the information delivery system according to the first embodiment.

The function of the server apparatus 200 according to the present embodiment will be first described. The server apparatus 200 according to the present embodiment includes a system information database 210 and a delivery request processor 220.

The auxiliary storage device 204 or the memory device 205, for example, may include the system information database 210 according to the present embodiment. The delivery request processor 220 according to the present embodiment functions in a manner in which the arithmetic processing unit 206 of the server apparatus 200 reads and executes the delivery request program that is loaded on, for example, the memory device 205.

The system information database 210 according to the present embodiment contains system information including place information that is collected from each place server 300 and terminal information that is collected from each terminal device 400. The detail of the system information database 210 will be described later.

The delivery request processor 220 refers the system information database 210 to specify the place server 300 the load of which is equal to or more than the predetermined degree. The delivery request processor 220 specifies another place server 300 that is requested to deliver the application that is to be delivered by the specified place server 300 and makes the delivery request. The detail of the delivery request processor 220 will be described later.

The function of each place server 300 according to the present embodiment will now be described. The place servers 300-1 and 300-2 according to the present embodiment have the same function. Accordingly, the function will be described as the function of each place server 300.

Each place server 300 according to the present embodiment includes a place information database 310, a place information collector 320, and an application deliverer 330.

The auxiliary storage device 304 or the memory device 305, for example, may include the place information database 310 according to the present embodiment. The place information collector 320 and the application deliverer 330 according to the present embodiment function in a manner in which the arithmetic processing unit 306 of the place server 300 reads and executes programs that are loaded on, for example, the memory device 305.

The place information database 310 according to the present embodiment contains the place information about the place server 300 that is collected by the place information collector 320.

The place information collector 320 collects the place information, stores the place information in the place information database 310, and sends the place information to the server apparatus 200.

The application deliverer 330 has a delivery application 340. When one of the terminal devices 400 gets access thereto, the application deliverer 330 refers the place information database 310 and delivers the delivery application 340 to the terminal device 400 in the case where the terminal device 400 is a delivery destination of the application.

When the server apparatus 200 instructs the application deliverer 330 to make the delivery request of the delivery application 340 to another place server 300, the application deliverer 330 appends a terminal ID of the terminal device 400 that is specified by the delivery request processor 220 to a part or the whole of the delivery application 340 and sends (delegates) these to the other place server 300.

The function of each terminal device 400 according to the present embodiment will now be described. The terminal device 400 according to the present embodiment is a computer that includes an arithmetic processing unit and a memory device and is an information processing apparatus.

Each terminal device 400 according to the present embodiment includes a terminal information database 410, a terminal information collector 420, a resource information collector 430, and an application manager 440.

The terminal information database 410 contains terminal information that is connected by the terminal information collector 420. The detail of the terminal information database 410 will be described later.

The terminal information collector 420 stores the terminal information about the terminal device 400 in the terminal information database 410. The terminal information collector 420 sends the terminal information that is stored in the terminal information database 410 to the server apparatus 200. The detail of the terminal information will be described later.

The resource information collector 430 collects resource information about the resources of the terminal device 400. The resource information is information that is included in the terminal information, and examples thereof include information about the communication method, position, and battery level of the terminal device 400. Accordingly, the resource information collector 430 stores the collected resource information as a part of the terminal information in the terminal information database 410.

The application manager 440 stores application information about application delivery from each place server 300 as a part of the terminal information in the terminal information database 410. Examples of the application information include information about the application that is to be delivered to each terminal device 400 and an application that may be used in correspondence with position information of the terminal device 400.

Figure 6:
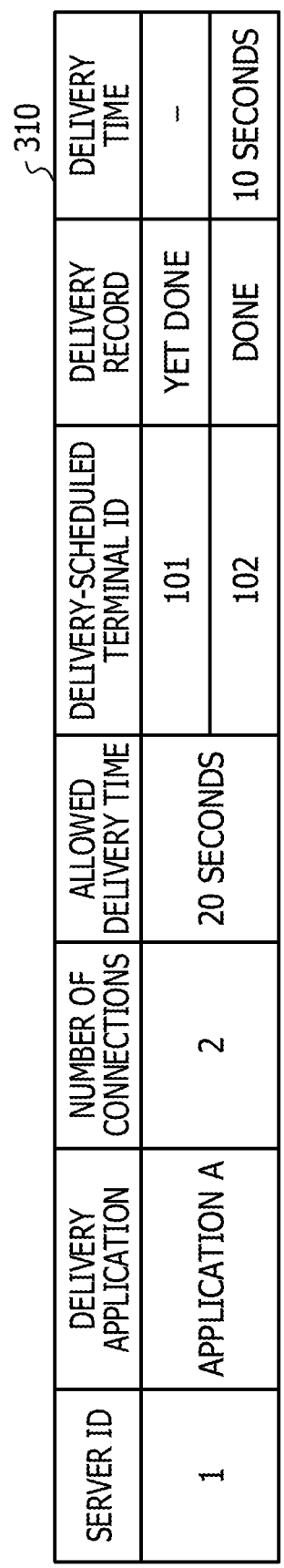
FIG. 6 illustrates an example of a place information database according to the first embodiment.

The place information database 310 according to the present embodiment will now be described with reference to FIG. 6. FIG. 6 illustrates an example of the place information database according to the first embodiment.

The place information database 310 according to the present embodiment contains information items such as a server ID, a delivery application, the number of connections, an allowed delivery time, a delivery-scheduled terminal ID, a delivery record, and a delivery time. The item "server ID" is associated with the other items. In the following description, information including the value of the item "server ID" and the values of the other items in the place information database 310 is referred to as the place information.

The place information database 310 according to the present embodiment is updated whenever the number of the terminal devices 400 that are connected to the corresponding place server 300 changes.

The value of the item "server ID" represents identification information to specify the place server 300.

The value of the item "delivery application" represents information that specifies the application that is to be delivered by the place server 300. In an example in FIG. 6, the information that specifies the application is the name of the application but is not limited thereto. An example of the information that specifies the application may include the identifier of the application. The value of the item "delivery application" according to the present embodiment may include information about the size (capacity) of the application.

The value of the item "number of connections" represents the number of the terminal devices 400 that are connected to the place server 300. For example, the value of the item "number of connections" represents the number of the terminal devices 400 to which the place server 300 delivers the application.

The value of the item "allowed delivery time" represents time allowed to deliver the application. According to the present embodiment, when time for which the application is delivered is longer than the allowed delivery time, it is decided that the load of the place server 300 is equal to or more than the predetermined degree. Accordingly, the value of the item "allowed delivery time" may be said to be a threshold that is referred to decide whether the load of the place server 300 is equal to or more than the predetermined degree. The value of the item "allowed delivery time" is determined in advance for every place server 300.

The value of the item "delivery-scheduled terminal ID" represents information that specifies the terminal device 400 to which the application that is specified by the value of the item "delivery application" is to be delivered. According to the present embodiment, for example, when one of the terminal devices 400 reserves delivery of the delivery application at the place server 300, the terminal ID of the terminal device 400 may be stored as the value of the item "delivery-scheduled terminal ID" in the place information database 310.

The value of the item "delivery record" represents whether the place server 300 has delivered the application to the terminal device 400 that is represented by the corresponding delivery-scheduled terminal ID. When the value of the item "delivery record" is "done", the application has been delivered to the terminal device 400. When the value of the item "delivery record" is "yet done", the application has not yet been delivered to the terminal device 400.

The value of the item "delivery time" represents the time for which the application is delivered. For example, the value of the item "delivery time" is calculated in accordance with the method of communication between the place server 300 and the corresponding terminal device 400, the size of the application, and the number of the connections of the terminal devices 400.

The terminal information database 410 according to the present embodiment will now be described with reference to FIG. 7. FIG. 7 illustrates an example of the terminal information database according to the first embodiment.

The terminal information database 410 according to the present embodiment contains information items such as the terminal ID, the resource information, and application management information. The item "terminal ID" is associated with the other items. In the following description, information including the value of the item "terminal ID" and the values of the other items in the terminal information database 410 is referred to as the terminal information.

The value of the item "terminal ID" in the terminal information database 410 represents information that specifies the terminal device 400.

The value of the item "resource information" includes information about the resources of the terminal device 400.

The item "resource information" is associated with items "communication method", "position information", and "battery level". The value of the item "communication method" represents the communication method when the terminal device 400 communicates with each place server 300. The value of the item "position information" is information about the current position of the terminal device 400 that is obtained by, for example, the GPS (Global Positioning System) function of the terminal device 400. The value of the item "battery level" represents the battery level of the terminal device 400.

The resource information of the terminal device 400 is not limited to the items illustrated in FIG. 7. The resource information of the terminal device 400 may include another item other than the items illustrated in FIG. 7.

The value of the item "application management information" represents information about the application that is delivered from each place server 300. According to the present embodiment, the value of the item "application management information" is associated with items "usable application" and "application use history".

The value of the item "usable application" represents the application that the terminal device 400 may use at a position represented by the position information. For example, in the case where the position represented by the position information is located inside the service coverage areas of both of the place servers 300-1 and 300-2, the applications that are delivered by the respective place servers 300-1 and 300-2 may be used.

The value of the item "application use history" represents the application that the terminal device 400 has used.

The system information database 210 of the server apparatus 200 according to the present embodiment will now be described with reference to FIG. 8.

FIG. 8 illustrates an example of the system information database according to the first embodiment. The system information database 210 according to the present embodiment contains an integrated place information 211 including a set of the place information that is collected by the place information collector 320 of each place server 300 and an integrated terminal information 212 including a set of the terminal information that is collected by the terminal information collector 420 of each terminal device 400.

The integrated place information 211 includes a set of the place information described with reference to FIG. 6. For example, in the integrated place information 211, the place information that is collected from each place server 300 is associated with information about time at which the place information is collected from the place server 300.

The integrated terminal information 212 includes a set of the terminal information described with reference to FIG. 7. For example, in the integrated terminal information 212, the terminal information that is collected from each terminal device 400 is associated with information about time at which the terminal information is collected from the terminal device 400.

Figure 9:
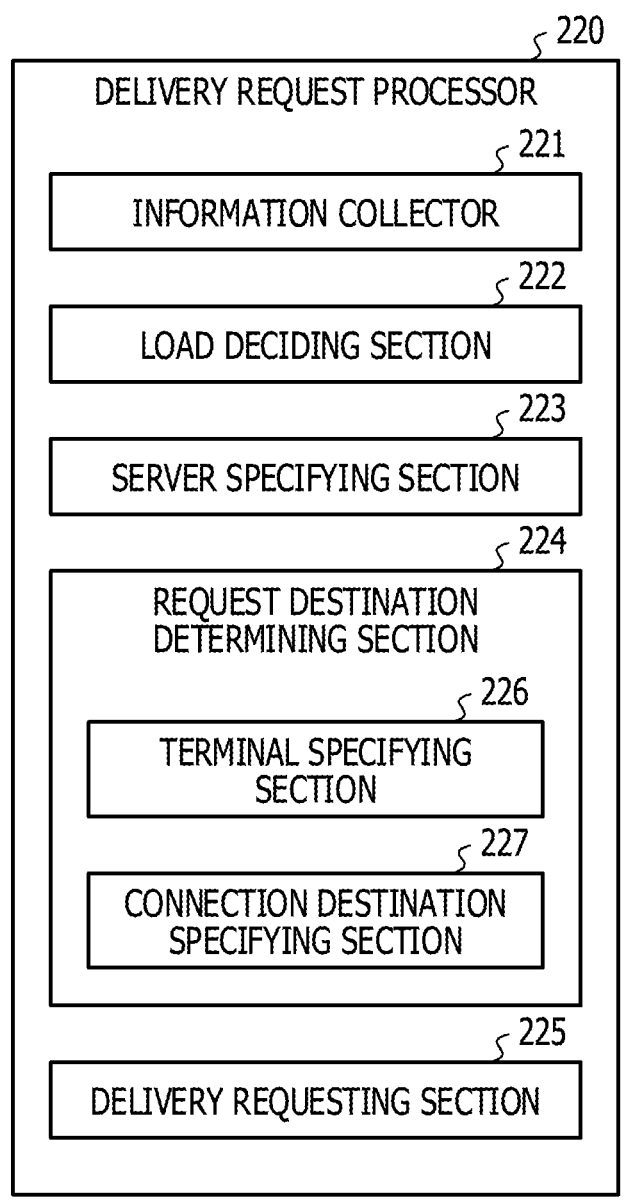
FIG. 9 illustrates the function of a delivery request processor according to the first embodiment.

The delivery request processor 220 according to the present embodiment will now be described with reference to FIG. 9. FIG. 9 illustrates the function of the delivery request processor according to the first embodiment.

The delivery request processor 220 according to the present embodiment includes an information collector 221, a load deciding section 222, a server specifying section 223, a request destination determining section 224, and a delivery requesting section 225.

The information collector 221 collects the place information from each place server 300 at predetermined intervals, associates the collected place information of the place server 300 with information about time at which the place information is collected, and stores the information in the system information database 210.

The information collector 221 according to the present embodiment collects the terminal information from each terminal device 400 at predetermined intervals, associates the collected terminal information with information about time at which the terminal information is collected, and stores the information in the system information database 210.

The load deciding section 222 decides whether the load of application delivery of any server is equal to or more than the predetermined degree based on the allowed delivery time that is included in the place information that is collected from each place server 300.

The server specifying section 223 specifies the place server 300 the load of which is equal to or more than the predetermined degree based on the result of decision of the load deciding section 222.

When the server specifying section 223 specifies the place server 300, the request destination determining section 224 refers the system information database 210 to determine the place server 300 that is a request destination to which delivery of the application corresponding to the specified place server 300 is requested. The detail of the request destination determining section 224 will be described later.

The delivery requesting section 225 sends a part of the delivery application 340 of the specified place server 300 and the delivery request to the place server 300 that is determined by the request destination determining section 224. The detail of the delivery requesting section 225 will be described later.

The request destination determining section 224 according to the present embodiment will be further described below. The request destination determining section 224 according to the present embodiment includes a terminal specifying section 226 and a connection destination specifying section 227.

The terminal specifying section 226 refers the integrated place information 211 of the system information database 210 to extract the delivery-scheduled terminal ID from the place information of the place server 300 that is decided that the load of the place server 300 is equal to or more than the predetermined degree. The terminal specifying section 226 thus specifies the terminal device 400 to which the delivery application 340 of the place server 300, which is decided that the load of the place server 300 is equal to or more than the predetermined degree, is to be delivered.

In the following description, the place server 300 that is decided that the load of the place server 300 is equal to or more than the predetermined degree is referred to as the overload place server 300.

The terminal specifying section 226 refers the position information that is included in the terminal information corresponding to the extracted delivery-scheduled terminal ID in the integrated terminal information 212 of the system information database 210. The terminal specifying section 226 obtains the delivery-scheduled terminal ID of the terminal device 400 located outside the service coverage area of the overload place server 300 among each terminal device 400 represented by the delivery-scheduled terminal ID.

Subsequently, the terminal specifying section 226 refers the position information recorded every time in the terminal information including the obtained delivery-scheduled terminal ID to seek the direction of movement of the terminal device 400 represented by this delivery-scheduled terminal ID. The terminal specifying section 226 specifies the terminal device 400 that is nearest to the overload place server 300 among each terminal device 400 that move toward the service coverage area of the overload place server 300.

When the terminal specifying section 226 specifies the terminal device 400, the connection destination specifying section 227 refers the integrated terminal information 212 of the system information database 210. The connection destination specifying section 227 specifies the place server 300 the delivery-scheduled terminal ID of which includes the terminal ID of the specified terminal device 400.

The request destination determining section 224 according to the present embodiment determines that the request destination that is requested to deliver a part of the delivery application 340 of the overload place server 300 is the place server 300 that is specified by the connection destination specifying section 227.

The process of the delivery requesting section 225 will now be described. When the request destination determining section 224 determines the place server 300 of the request destination, the delivery requesting section 225 according to the present embodiment obtains the delivery-scheduled terminal ID that is included in the place information of the overload place server 300. The delivery requesting section 225 extracts the delivery-scheduled terminal ID of the terminal device 400 that moves toward the service coverage area of the overload place server 300.

Subsequently, the delivery requesting section 225 associates the extracted delivery-scheduled terminal ID with a part of the application that is to be delivered and that the overload place server 300 has and sends these to the place server 300 of the request destination together with the delivery request.

According to the present embodiment, the delivery request made in this way enables delivery of the part of the application that is to be delivered by the overload place server 300 to be requested only for the terminal device 400 that moves toward the service area of the overload place server 300.

Consequently, according to the present embodiment, the delivery request of the application is not made for the terminal device 400 that moves away from the service coverage area of the overload place server 300, for example, even when the terminal device 400 is located inside the service coverage area of the place server 300 near the overload place server 300.

Accordingly, the present embodiment inhibits an unnecessary delivery request of the application from being made. Consequently, according to the present embodiment, the load of the place server 300 that is specified as the request destination is inhibited from increasing.

Figure 10:
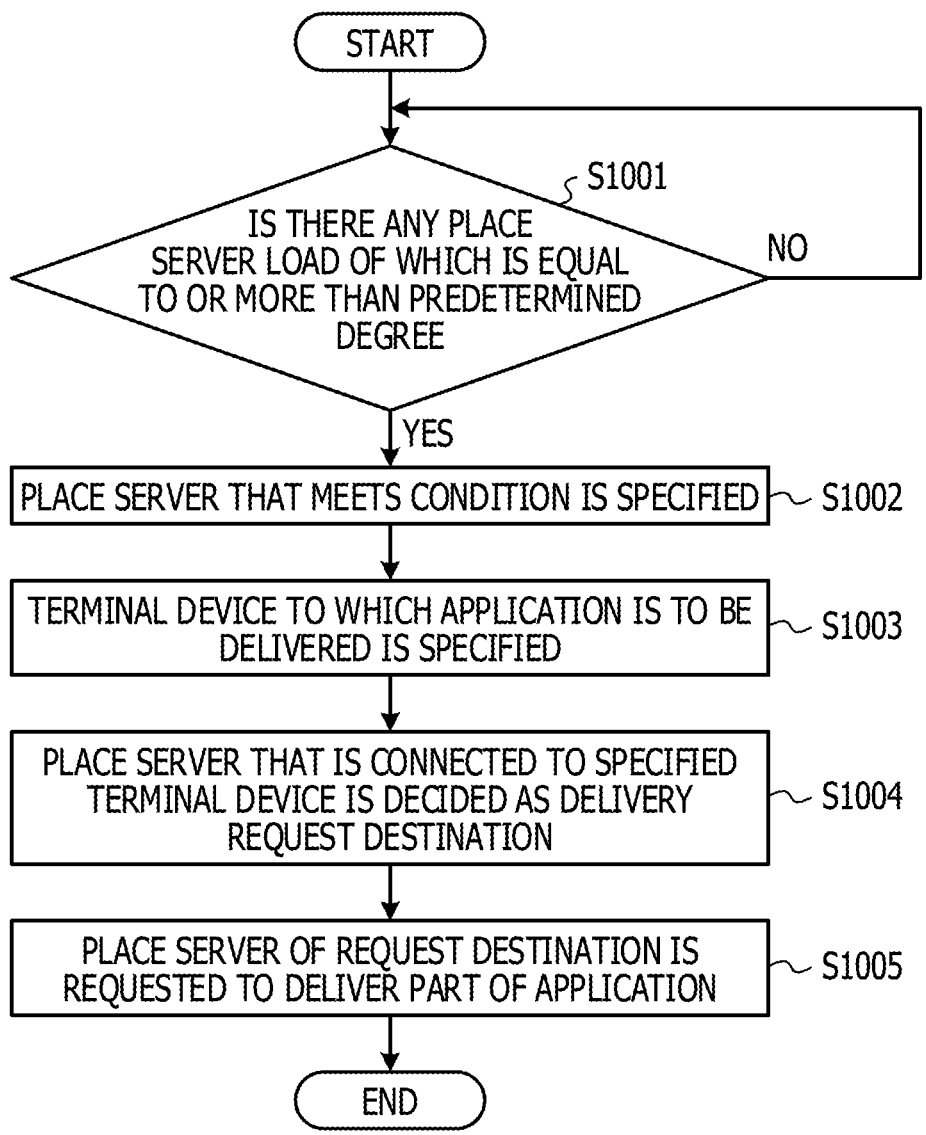
FIG. 10 is a flowchart illustrating the operation of the delivery request processor according to the first embodiment.

The operation of the delivery request processor 220 according to the present embodiment will now be described with reference to FIG. 10. FIG. 10 is a flowchart illustrating the operation of the delivery request processor according to the first embodiment. The delivery request processor 220 according to the present embodiment performs the processes illustrated in FIG. 10 at predetermined intervals.

The load deciding section 222 of the delivery request processor 220 according to the present embodiment decides whether there is any place server 300 the load of which is equal to or more than the predetermined degree in the information delivery system 100 (step S1001).

For example, the load deciding section 222 calculates the delivery time for which each place server 300 delivers the application to the terminal devices 400 that are connected to the place server 300 based on the corresponding place information. The load deciding section 222 decides whether there is any place server 300 the calculated delivery time of which is equal to or more than the allowed delivery time. When at least one of the place servers 300 meets the above condition, the load deciding section 222 decides that the load of the place server 300 is equal to or more than the predetermined degree.

At the step S1001, when no place server 300 meets the above condition, the delivery request processor 220 finishes the process.

At the step S1001, when at least one of the place servers 300 meets the above condition, the server specifying section 223 of the delivery request processor 220 specifies the overload place server 300 that meets the above condition (step S1002).

Subsequently, the terminal specifying section 226 of the request destination determining section 224 of the delivery request processor 220 specifies the terminal devices 400 to which the overload place server 300 is to deliver the delivery application 340 (step S1003).

For example, the terminal specifying section 226 refers the integrated place information 211 of the system information database 210 to extract the delivery-scheduled terminal ID from the place information that includes the server ID of the overload place server 300.

Subsequently, the terminal specifying section 226 refers the integrated terminal information 212 of the system information database 210 to seek the direction of movement of each terminal device 400 represented by the delivery-scheduled terminal ID.

The terminal specifying section 226 finds the terminal devices 400 that are located outside the service coverage area of the overload place server 300 and that move toward the service coverage area among each terminal device 400 represented by the delivery-scheduled terminal ID, and specifies these terminal devices 400 as the terminal devices 400 to which the delivery application 340 is to be delivered.

At this time, the terminal specifying section 226 also specifies the terminal device 400 that is nearest to the overload place server 300 among each terminal device 400 to which the delivery application 340 is to be delivered.

Subsequently, the delivery request processor 220 specifies the place server 300 that is the connection destination to which the terminal devices 400 that are specified by the terminal specifying section 226 are connected by using the connection destination specifying section 227 of the request destination determining section 224, and decides that the place server 300 is the delivery request destination (step S1004).

For example, the connection destination specifying section 227 refers the integrated place information 211 of the system information database 210 to specify the place server 300 the delivery-scheduled terminal ID of which includes the terminal ID of the terminal device 400 that is nearest to the overload place server 300, and decides that the place server 300 is the delivery request destination.

Subsequently, the delivery requesting section 225 requests the place server 300 that is decided as the request destination to deliver the delivery application 340 of the overload place server 300 (step S1005) and finishes the process.

For example, the delivery requesting section 225 causes the application deliverer 330 of the overload place server 300 to append the terminal ID of each terminal device 400 that is specified at the step S1003 to the delivery application 340 of the overload place server 300. The delivery requesting section 225 causes the application deliverer 330 to send the delivery application to which the terminal ID is appended to the place server 300 of the request destination.

The application that is delivered by the place server 300 of the request destination may be a part of the delivery application 340 of the overload place server 300.

The part of the delivery application 340 that is delivered from the place server 300 of the request destination is determined, for example, such that the delivery time in the place information corresponding to the overload place server 300 is within the allowed delivery time.

For example, assuming that 10 terminal devices 400 are connected to the overload place server 300. In this case, for example, the delivery requesting section 225 may request the place server 300 of the request destination to deliver the whole application that is to be delivered by the overload place server 300.

The delivery requesting section 225 may divide the delivery application 340 of the overload place server 300 such that the delivery time in the place information of the overload place server 300 is less than the allowed delivery time. The delivery requesting section 225 may request the place server 300 of the request destination to deliver a divided part of the delivery application 340. For example, the delivery requesting section 225 according to the present embodiment may learn the percentage of the delivery application 340 delivery of which is requested whenever the delivery request is made to the place server 300 of the request destination.

For example, the delivery requesting section 225 may request the place server 300 of the request destination to deliver the delivery application 340 to some of the terminal devices 400 among the terminal devices 400 represented by the delivery-scheduled terminal ID of the overload place server 300.

In the information delivery system 100 according to the present embodiment, when the place server 300 that is decided as the overload place server 300 detects that one of the terminal devices 400 represented by the delivery-scheduled terminal ID enters the service coverage area thereof, the application deliverer 330 of the place server 300 delivers the delivery application 340 that is not delivered. The application deliverer 330 permits the terminal device 400 to execute the delivery application 340.

The information delivery system 100 according to the present embodiment thus allows the terminal device 400 to download the application that is provided by the place server 300 that is decided as the overload place server from both of the place server 300 that is decided as the overload place server and another place server 300.

For example, the delivery requesting section 225 according to the present embodiment may refer the resource information that is included in the terminal information corresponding to the terminal ID appended to the application and may make the delivery request of the application in descending order of the battery level of the terminal devices 400. This enables the application to be preferentially delivered to the terminal device 400 that is capable of using the delivered application for a long time.

The delivery requesting section 225 according to the present embodiment may refer the resource information that is included in the terminal information corresponding to the terminal ID appended to the application and may make the delivery request of the application in ascending order of distance between the position represented by the position information and the overload place server 300. This enables the application to be downloaded in ascending order of time at which the terminal devices 400 start using the application.

The delivery requesting section 225 according to the present embodiment may refer the application management information that is included in the terminal information corresponding to the terminal ID appended to the delivery application 340 and may deliver the delivery application 340 to the terminal devices 400 in order in accordance with the use history of the delivery application 340. For example, the delivery requesting section 225 may deliver the delivery application 340 in descending order of frequency at which the terminal devices 400 use the delivery application 340. This enables the delivery application 340 to be downloaded in descending order of possibility that the terminal devices 400 use the delivery application 340.

The delivery request processor 220 according to the present embodiment may cancel the delivery request, for example, in the case where the place server 300 to which the delivery request is made does not deliver the delivery application 340 to one of the terminal devices 400 within a predetermined time. According to the present embodiment, when the delivery application 340 downloaded by the terminal device 400 is not used within a predetermined time, the terminal device 400 may be instructed to delete the delivery application 340.

According to the present embodiment described above, an unnecessary delivery request of the application for, for example, the terminal devices 400 to which the delivery application 340 may not be delivered is inhibited from being made.

Second Embodiment

A second embodiment will now be described with reference to the drawings. The second embodiment differs from the first embodiment in that each place server decides whether the load of the place server is equal to or more than the predetermined degree. Accordingly, in the following description of the second embodiment, only differences from the first embodiment will be described. Components having the same functions as those in the first embodiment are designated by reference numbers like to those described according to the first embodiment, and a description thereof is omitted.

Figure 11:
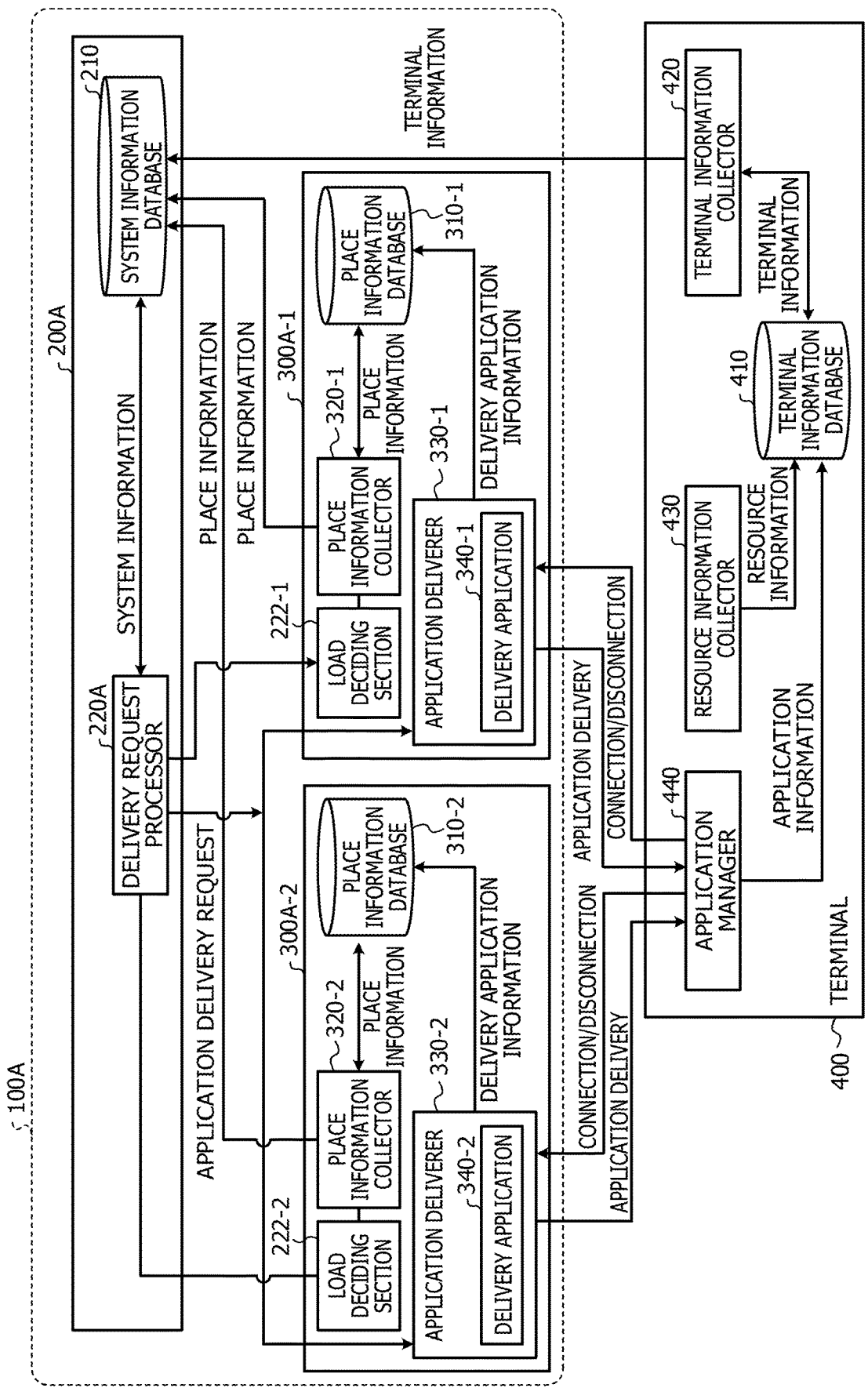
FIG. 11 illustrates the functions of apparatuses that are included in an information delivery system according to a second embodiment.

FIG. 11 illustrates the functions of apparatuses that are included in the information delivery system according to the second embodiment.

An information delivery system 100A according to the present embodiment includes a server apparatus 200A and place servers 300A.

The server apparatus 200A includes a delivery request processor 220A. Each place server 300A includes the place information database 310, the place information collector 320, the application deliverer 330, and the load deciding section 222.

Each place server 300A according to the present embodiment, which includes the load deciding section 222, decides whether the load of the place server 300A is equal to or more than the predetermined degree. When the load of the place server is equal to or more than the predetermined degree, the load deciding section 222 notifies the decision to the server apparatus 200A.

When the delivery request processor 220A of the server apparatus 200A receives the notification from the place server 300A, the delivery request processor 220A determines the place server 300 of the request destination to which the delivery request of the delivery application 340 of the place server 300A that has made the notification is to be made, and makes the delivery request.

Figure 12:
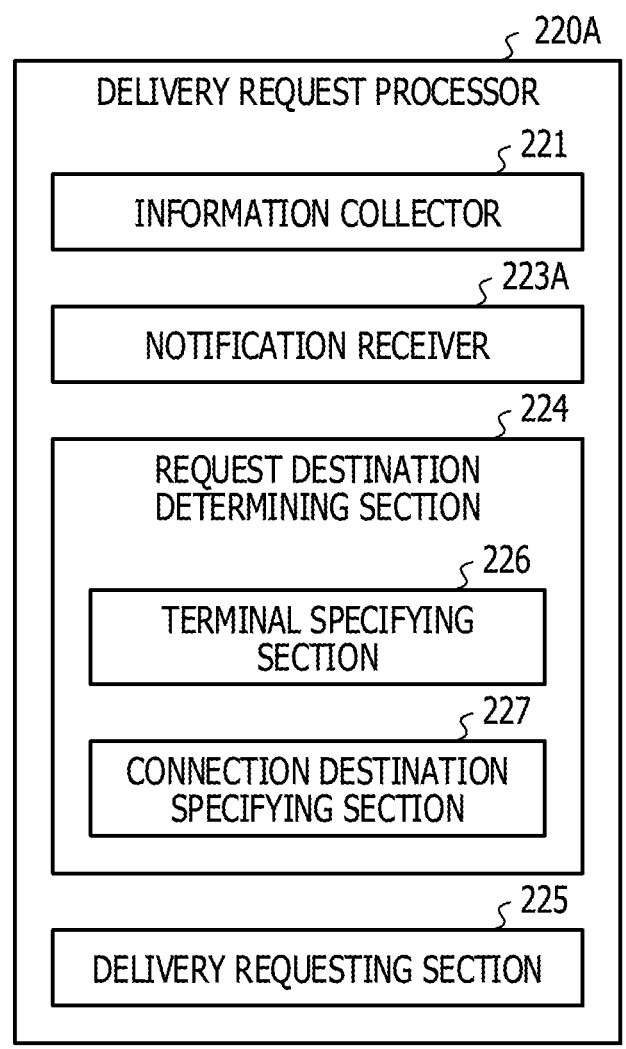
FIG. 12 illustrates the function of a delivery request processor according to the second embodiment.

FIG. 12 illustrates the function of the delivery request processor according to the second embodiment. The delivery request processor 220A according to the present embodiment includes the information collector 221, a notification receiver 223A, the request destination determining section 224, and the delivery requesting section 225.

When the notification receiver 223A according to the present embodiment receives the notification representing that the load is equal to or more than the predetermined degree from the place server 300A, the notification receiver 223A specifies the place server 300A that has made the notification as the overload place server 300A.

Figure 13:
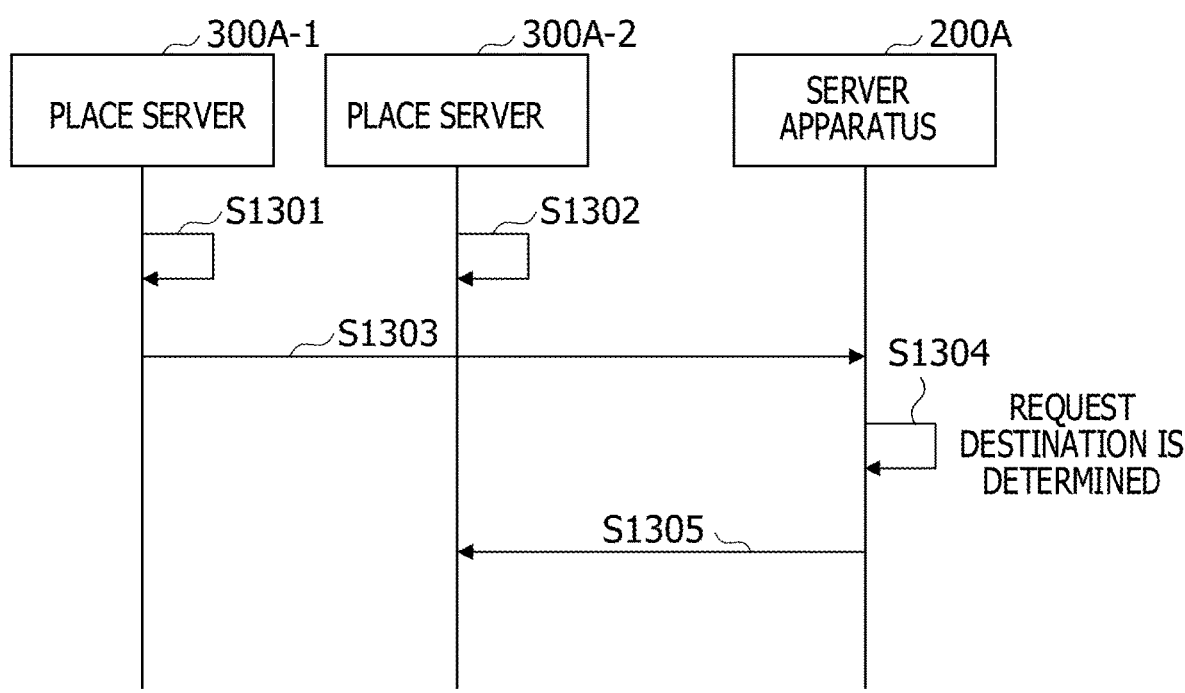
FIG. 13 is a sequence diagram illustrating the operation of the information delivery system according to the second embodiment.

The operation of the information delivery system 100A according to the present embodiment will now be described with reference to FIG. 13. FIG. 13 is a sequence diagram illustrating the operation of the information delivery system according to the second embodiment. FIG. 13 illustrates the operation of the information delivery system 100A when the load of one of the place servers 300A is equal to or more than the predetermined degree by way of example.

The load deciding sections 222 of the place servers 300A-1 and 300A-2 of the information delivery system 100A according to the present embodiment decide whether the loads of the place servers 300A-1 and 300A-2 are equal to or more than the predetermined degree (steps S1301 and 1302).

At the step S1301, the place server 300A-1 decides that the load of the place server 300A-1 is equal to or more than the predetermined degree and notifies the decision to the server apparatus 200A (step S1303). At this time, the place server 300A-2 decides that the load of the place server 300A-2 is less than the predetermined degree and does not make a notification.

When the server apparatus 200A receives the notification from the place server 300A-1, the delivery request processor 220A of the server apparatus 200A determines the place server 300A of the request destination to which delivery of the delivery application 340 of the place server 300A-1 is requested and makes the delivery request (step S1304). In an example in FIG. 13, the place server 300A-2 is determined as the request destination.

Accordingly, the server apparatus 200A makes the delivery request of the delivery application 340 of the place server 300A-1 to the place server 300A-2 (step S1305) and finishes the process.

At the step S1304, the delivery request processor 220A may perform the processes from the step S1003 to the step S1005 in FIG. 10.

According to the present embodiment described above, each place server 300A makes the notification to the server apparatus 200A when the load of the place server 300A is equal to or more than the predetermined degree. According to the present embodiment, the server apparatus 200A may not search the place server the load of which is equal to or more than the predetermined degree, and the burden of the process of the server apparatus 200A is decreased.

The present disclosure is not limited to the embodiments that are specifically described. Various modifications and alterations may be made without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information delivery system comprising:
a plurality of information processing apparatuses that deliver an application to a plurality of terminal devices; and
a server apparatus that:
specifies a first terminal device to which the application is delivered in accordance with a positional relationship between the first terminal device and a first information processing apparatus among the plurality of information processing apparatuses, the load of application delivery of the first information processing apparatus being equal to or greater than a predetermined value and wherein the first terminal device moves from an outside of a service coverage area of the first information processing apparatus toward the service coverage area,
transmits a delivery request of the application to a second information processing apparatus, among the plurality of information processing apparatuses, that differs from the first information processing apparatus, the second information processing apparatus being communicatively connected to the first terminal device, and
stores terminal information including position information of the first terminal device and information about a connection destination to which the first terminal device is connected, and place information including information about the first terminal device,
wherein the second information processing apparatus delivers at least a portion of the application to the first terminal device in accordance with the delivery request.

2. The information delivery system according to claim 1, wherein the first terminal device is nearest to the first information processing apparatus among a plurality of terminal devices located outside the service coverage area.

3. The information delivery system according to claim 1, wherein identification information about the first terminal device is appended to the at least a portion of the application.

4. The information delivery system according to claim 1, wherein the place information includes information about time for which each of the plurality of information processing apparatuses delivers the application and time allowed to deliver the application, and
wherein the delivery request is made to the second information processing apparatus when time for which the first information processing apparatus delivers the application is equal to or more than the time allowed.

5. An information delivery method comprising:
specifying a first terminal device, among a plurality of terminal devices, to which an application is delivered in accordance with a positional relationship between the first terminal device and a first information processing apparatus among a plurality of information processing apparatuses, the load of application delivery of the first information processing apparatus being equal to or greater than a predetermined value and wherein the first terminal device moves from an outside of a service coverage area of the first information processing apparatus toward the service coverage area;

transmitting a delivery request of the application to a second information processing apparatus, among the plurality of information processing apparatuses, that differs from the first information processing apparatus, the second information processing apparatus being communicatively connected to the first terminal device; and storing terminal information including position information of the first terminal device and information about a connection destination to which the first terminal device is connected, and place information including information about the first terminal device.

6. An server apparatus comprising:

a memory; and a processor coupled to the memory and the processor configured to:

specify a first terminal device, among a plurality of terminal devices, to which an application is delivered in accordance with a positional relationship between the first terminal device and a first information processing apparatus among a plurality of information processing apparatuses, the load of application delivery of the first information processing apparatus being equal to or greater than a predetermined value and wherein the first terminal device moves from an outside of a service coverage area of the first information processing apparatus toward the service coverage area;

transmit a deliver request of the application to a second information processing apparatus, among the plurality of information processing apparatuses, that differs from the first information processing apparatus, the second information processing apparatus being communicatively connected to the first terminal device; and storing terminal information including position information of the first terminal device and information about a connection destination to which the first terminal device is connected, and place information including information about the first terminal device.

* * * * *